United States Patent Office 3,152,514
Patented Oct. 13, 1964

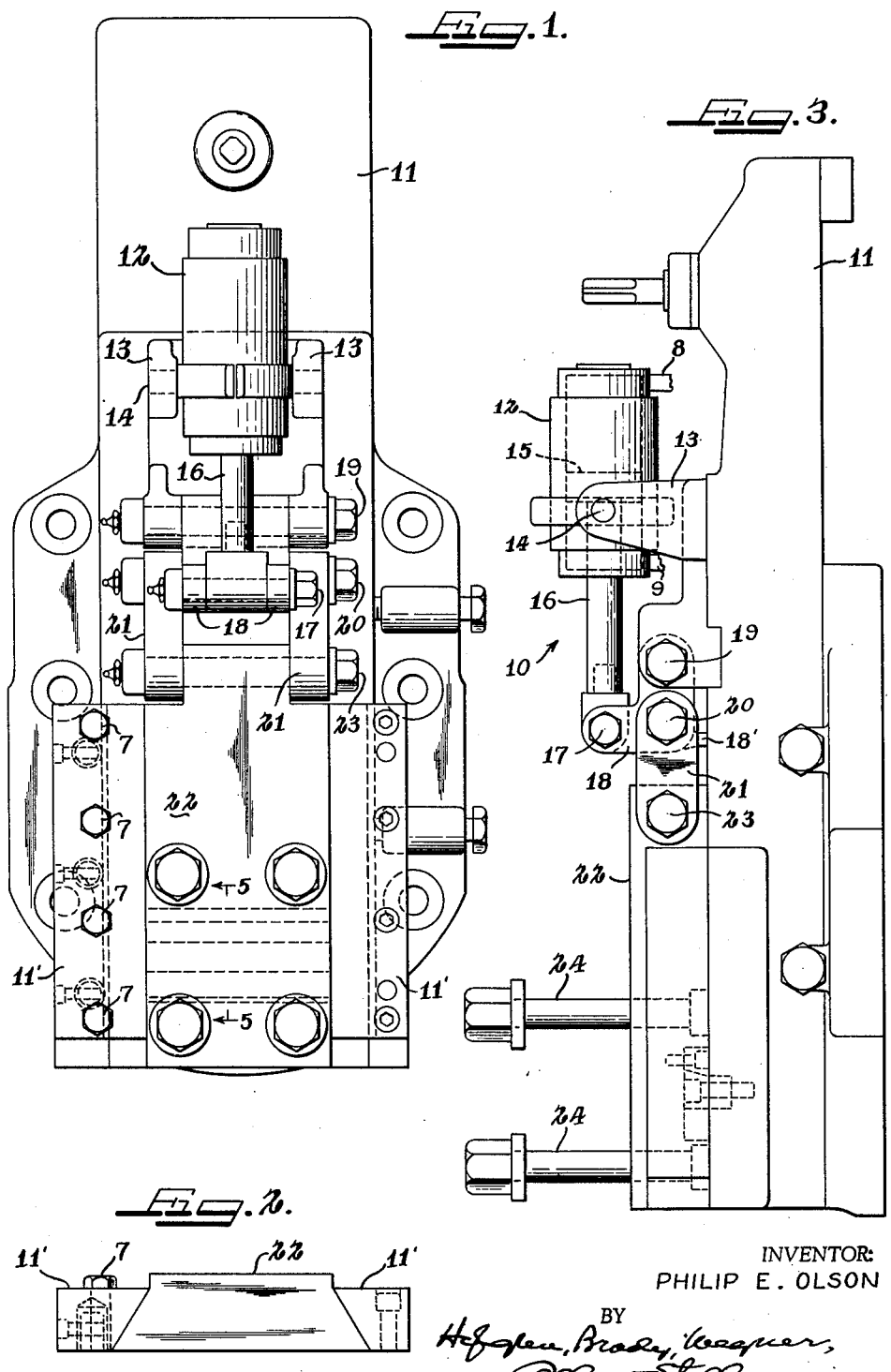

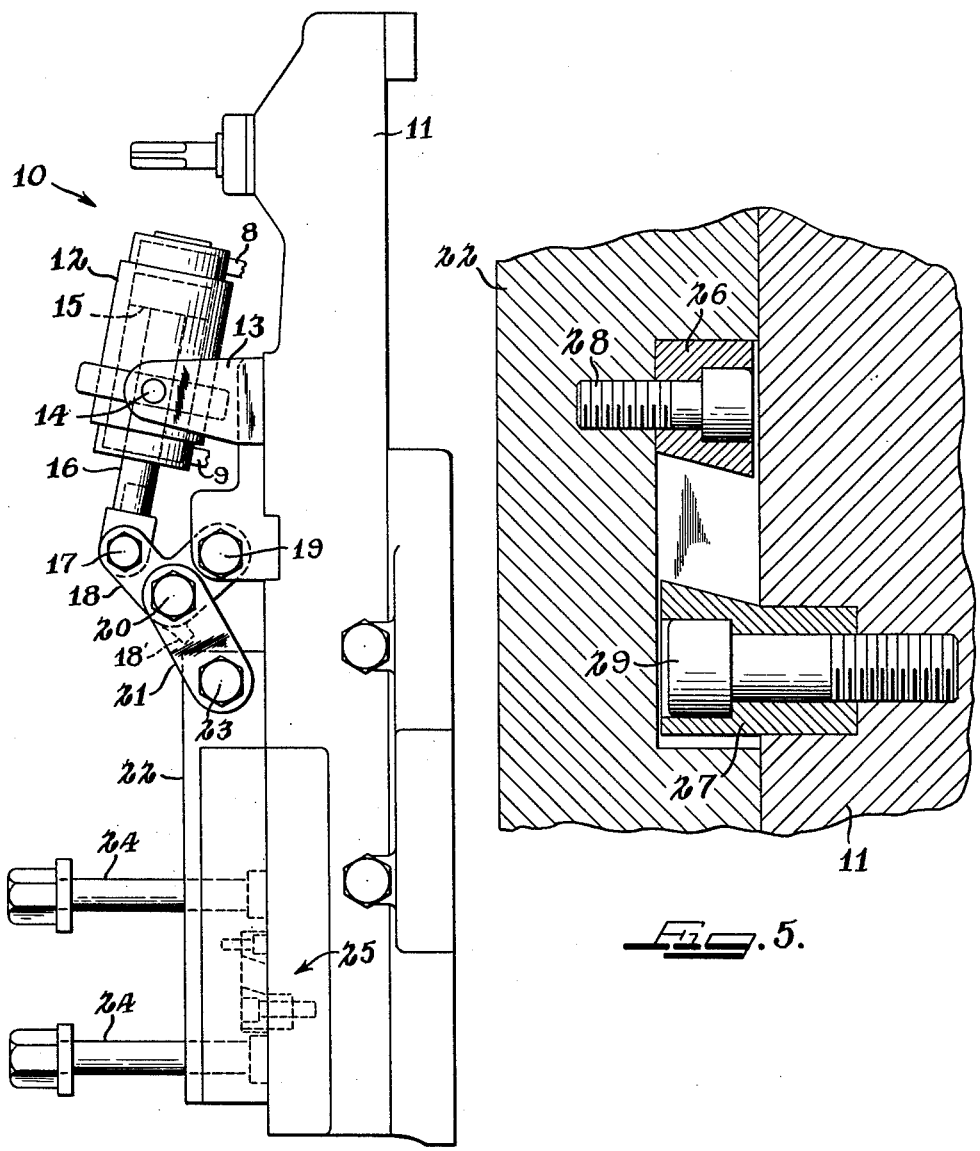

3,152,514
TOOL LIFTER FOR PLANER OR THE LIKE
Philip E. Olson, Rockford, Ill., assignor, by mesne assignments, to Rockford Machine Tool Co., a corporation of Illinois
Filed Dec. 20, 1961, Ser. No. 160,811
1 Claim. (Cl. 90—55)

This invention relates to tool lifters and more particularly to a new and improved hydraulic tool lifter for planers, slotters and the like.

A frequently encountered situation in the machine tool industry is the need in heavy form tool work for a tool lifting mechanism adaptable to lift the tool at right angles to the work. This is particularly necessary where time is very important, and a sure, simple locking method must be provided to support the tool in its cutting position.

It is therefore an object of this invention to provide a tool lifting mechanism which positively raises the tool from the cutting surface on the return or non-cutting stroke, yet firmly locks the cutting tool in its position on the cutting or work stroke.

Another object of the invention is to provide a hydraulic tool lifting mechanism using a cylinder and piston device and a connecting means between the piston and tool holder including a bell crank and a link which operates to raise the tool rectilinearly from the work on the return stroke, and to form a toggle lock holding the tool rigidly in position during the work stroke.

Other objects and advantages will become readily apparent from the following detailed description taken in connection with the accompanying drawing, in which:

FIGURE 1 is a front elevation of the invention mounted on the planer slide;

FIGURE 2 is a fragmentary end view of FIGURE 1;

FIGURE 3 is a side elevation thereof showing the tool holder in its down position;

FIGURE 4 is another side elevation showing the tool holder in its raised position; and FIGURE 5 is an enlarged fragmentary vertical section along line 5—5 of FIGURE 1.

While an illustrative embodiment of the invention is shown in the drawings and will be described in detail herein, the invention is susceptible of embodiment in other forms, and it should be understood that the present disclosure is to be considered as an exemplification of the principles of the invention and is not intended to limit the invention to the embodiment illustrated. The scope of the invention will be pointed out in the appended claim.

Referring to the drawings, the tool lifter, indicated generally at 10, is shown mounted on a tool slide 11, said slide 11 being adapted to be carried in a well known manner on a machine such as a planer or slotter (not shown). As is customary in the art, such a planer also includes a cross rail (not shown) for supporting and guiding the slide.

Slide ways 11' are affixed to slide 11 with bolts 7 and a tool holder 22 is slidably held for rectilinear movement in said slide ways 11'.

A cylinder 12 is pivotally mounted on the slide 11 above the tool holder 22 by forwardly projecting flanges 13 affixed to the slide 11 and pivot pins 14 extending through the flanges 13 and into the walls of cylinder 12. Thus, as best shown in FIGURE 4, the cylinder 12 may pivot in a vertical plane transverse to pivot pins 14 and along the center line of tool holder 22. Housed in the cylinder 12 is a movable piston 15 connected to piston rod 16. The piston rod 16 extends downwardly and is pivotally connected at 17 to one end of a bell crank 18, the other end of the bell crank 18 is pivotally mounted at 19 to slide 11. Bell crank 18 also includes a toggle stop 18', the purpose of which is more fully described hereinafter.

The mid-portion of the bell crank 18 is pivotally connected at 20 to one end of link 21, the other end of the link being connected to the tool holder 22 at pivot point 23.

Bolts 24 are affixed to the tool holder 22 in the usual manner to support a cutting tool (not shown). A limit stop mechanism shown generally at 25 is composed of two mating positive stop members 26 and 27, member 26 being affixed to the tool holder 22 by screw 28 and member 27 being affixed to the slide 11 by screw 29.

In operation, the tool lifter functions in the following manner: During the cutting stroke the cutting tool and tool holder 22 are in their down position as shown in FIGURE 3. As the planer completes its cutting stroke, a control mechanism of known form on the planer functions to control a hydraulic circuit to flow hydraulic fluid to one end of cylinder 12 through port 9. The hydraulic fluid raises piston 15 thereby raising piston rod 16 and through bell crank 18 and link 21 rectilinearly raises tool holder 22. This thereby raises tools affixed to the tool holder to provide clearance between the tool and the work during the return stroke of the table of the planer.

When the return stroke of the planer table is completed, hydraulic fluid flowing to the other end of cylinder 12 through port 8 lowers piston 15, thereby lowering piston rod 16, and pivoting bell crank 18 about its mounting 19 in a counter-clockwise direction to return the tool holder and the cutting tool to cutting position. As bell crank 18 nears its lowermost position, stop member 26 on the tool holder engages the stop member 27 positively to limit the downward movement of the tool holder. Somewhat simultaneously the bell crank swings through its extended position and toggle stop 18' contacts the slide 11 and prevents further movement of the bell crank 18 and link 21 to hold bell crank 18 and link 21 in their toggle locking position. The purpose of toggle stop 18' is to prevent upward movement of the cutting tool when tool holder 22 is in its down position and thereby firmly supports the cutting tool during the cutting operation.

I claim:

A tool lifter for planers of the like having a cross rail and a slide adapted to move on the cross rail, comprising: a tool holder mounted to move rectilinearly on the slide; and means to move and return the tool holder between a cutting position and a withdrawn position, said means including a hydraulic cylinder pivotally mounted on said slide, a piston in the cylinder having a rod extending therefrom, a bell crank having one end pivoted to the piston rod and the other end pivoted to the slide, and a link having one end pivoted to the tool holder and the other end pivoted to the mid-portion of the bell crank, said means being operable so that when the piston is moved in one direction the tool holder is raised to said withdrawn position and when moved in the other direction the tool holder is lowered to said cutting position, said means also including a toggle stop member wherein the bell crank, toggle stop member and link form a toggle lock to prevent upward movement of the tool holder when the tool holder is in its cutting position.

References Cited in the file of this patent
UNITED STATES PATENTS

| | | |
|---|---|---|
| 2,880,653 | Feld et al. | Apr. 7, 1959 |

FOREIGN PATENTS

| | | |
|---|---|---|
| 157,509 | Sweden | Jan. 8, 1957 |
| 714,455 | Great Britain | Aug. 25, 1954 |
| 790,717 | Great Britain | Feb. 12, 1958 |